(12) United States Patent
Höfers et al.

(10) Patent No.: US 6,590,903 B1
(45) Date of Patent: Jul. 8, 2003

(54) METHOD FOR THE TRANSMISSION OF AN ASYNCHRONOUS DATA STREAM VIA A SYNCHRONOUS DATA BUS, AND CIRCUIT ARRANGEMENT FOR CARRYING OUT THE METHOD

(75) Inventors: Thorsten Höfers, Zetel (DE); Karl-Heinz Knobl, Limburg (DE); Michael Schäfer, Hüttenberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/209,064

(22) Filed: Dec. 10, 1998

(30) Foreign Application Priority Data

Dec. 22, 1997 (DE) .......................... 197 57 195

(51) Int. Cl.$^7$ .................................................. H04J 3/16
(52) U.S. Cl. ..................................................... 370/466
(58) Field of Search ................................. 370/355, 358, 370/468, 466, 465, 397; 701/1, 200

(56) References Cited

U.S. PATENT DOCUMENTS

| | | | | |
|---|---|---|---|---|
| 4,679,191 A | * | 7/1987 | Nelson et al. ............... | 370/355 |
| 4,755,817 A | | 7/1988 | Vandenbulcke et al. ...................... | 340/825.57 |
| 5,054,020 A | * | 10/1991 | Meagher ..................... | 370/305 |
| 5,345,446 A | * | 9/1994 | Hiller et al. ................. | 370/358 |
| 5,475,628 A | * | 12/1995 | Adams et al. ............... | 708/313 |
| 5,649,176 A | * | 7/1997 | Selvidge et al. ............ | 713/400 |
| 5,710,769 A | * | 1/1998 | Anderson et al. ........... | 370/355 |
| 5,757,801 A | * | 5/1998 | Arimilli ....................... | 370/444 |
| 5,765,197 A | * | 6/1998 | Combs ........................ | 380/42 |

OTHER PUBLICATIONS

Adam Osborne, "Einfuhrung in die Mikrocomputer-Technik", pp. 5–34.

* cited by examiner

*Primary Examiner*—Wellington Chin
*Assistant Examiner*—William Schultz
(74) *Attorney, Agent, or Firm*—Steven R. Biren

(57) ABSTRACT

The invention relates to a method for the transmission of an asynchronous data stream, containing useful data, via a synchronous data bus which is arranged to transmit data frames in time multiplex. The invention is characterized in that the asynchronous data stream is converted into a synchronous, continuous data stream by means of a converter circuit, that within the data frames a selectable number of storage locations is provided for the useful data of the asynchronous data stream, that a variable number of useful data can be assigned to the individual data frames by the converter circuit and in dependence on the speed of the asynchronous data stream, and that protocol data is assigned to the individual data frames by means of the converter circuit, each time in a predetermined position within the data frames, which protocol data contains information as regards the number of useful data present in the relevant data frame.

11 Claims, 3 Drawing Sheets

|   53 | 54 | 55 | 56 | 57 | 58 | 59 | 60 |
|------|----|----|----|----|----|----|----|
| N1   | N2 | N3 |    | N4 | N5 | P  |    |

Fig. 4A

|   53 | 54 | 55 | 56 | 57 | 58 | 59 | 60 |
|------|----|----|----|----|----|----|----|
| N6   | N7 | 0  |    | 0  | 0  | P  |    |

Fig. 4B

| 70 | 71 | 72 | 73 | 74 | 75 | 76 | 77 |
|----|----|----|----|----|----|----|----|
| 1  | 1  | 0  | 0  | 1  | 0  | 0  | 0  |

Fig. 4C

| 70 | 71 | 72 | 73 | 74 | 75 | 76 | 77 |
|----|----|----|----|----|----|----|----|
| 0  | 1  | 0  | 0  | 0  | 0  | 0  | 0  |

Fig. 4D

METHOD FOR THE TRANSMISSION OF AN ASYNCHRONOUS DATA STREAM VIA A SYNCHRONOUS DATA BUS, AND CIRCUIT ARRANGEMENT FOR CARRYING OUT THE METHOD

The invention relates to a method for the transmission of an asynchronous data stream, containing useful data, via a synchronous data bus which is arranged to transmit data frames in time multiplex, as well as to a circuit arrangement for carrying out the method.

Methods of this kind are described, for example in Adam Osborne, Einführung in die Mikrocomputer-Tecnik, pages 5–34. The known methods use synchronization characters so as to adapt the different speed of the asynchronous data stream to a synchronous data transmission. When the asynchronous data transmitter has no further data available for transmission, the data stream is filled with synchronization characters until the next valid messages are ready for transmission. For this type of synchronous serial data transmission the microprocessor of the data transmitter must continuously generate the synchronization characters and the microprocessor of the data receiver must continuously read the data received and interpret the synchronization characters. Therefore, methods of this kind demand a high computing capacity of the microprocessors of the data transmitter and the data receiver.

It is an object of the invention to provide a different method of the kind set forth as well as a circuit arrangement for carrying out the method which both require less computing capacity of the microprocessors of the data transmitter and the data receiver.

This object is achieved by the method according to the invention in that the asynchronous data stream is converted into a synchronous, continuous data stream by means of a converter circuit, that within the data frames a selectable number of storage locations is provided for the useful data of the asynchronous data stream, that a variable number of useful data can be assigned to the individual data frames by means of the converter circuit and in dependence on the speed of the asynchronous data stream, and that protocol data is assigned to the individual data frames, via the converter circuit, each time in a predetermined position within the data frames, which protocol data contains information as regards the number of useful data contained in the relevant data frame.

The useful data of the asynchronous data stream is arranged in the data frames of the synchronous, continuous data bus by means of the converter circuit. The number of storage locations provided for the useful data of the asynchronous data stream in the individual data frames can vary in conformity with the specific application for which the converter circuit is used. It may be that only a very small part of the capacity of the synchronous data bus is utilized for the useful data of the asynchronous data stream, but it may also occur that the total capacity of the synchronous data bus is available to the useful data of the asynchronous data stream. The number of storage locations provided in the individual data frames for the useful data of the asynchronous data stream in conformity with the relevant application can be flexibly adjusted by means of the converter circuit. The data frames have a fixed data capacity and are serially transmitted in time multiplex via the synchronous data bus.

The quantity of asynchronous useful data applied to the converter circuit per unit of time varies in dependence on the speed of the asynchronous data stream. The converter circuit provides temporal decoupling of the asynchronous data stream and the synchronous data stream, for example by, means of a FIFO. A FIFO is a "First In-First Out" shift register.

For as long as a sufficient quantity of useful data of the asynchronous data stream is present in the converter circuit, the storage locations provided for the asynchronous data stream within the data frames are filled with useful data. If the number of useful data is smaller than the number of storage locations provided in the relevant data frame, the storage locations provided but not required for the asynchronous data stream are filled with definable values, for example zeros, by the converter circuit. If no useful data is present at a given instant, all storage locations are filled, for example with zeros. The respective number of valid useful data assigned to a data frame is counted by means of the converter circuit and added to the relevant data frame as protocol data in a predetermined position. Via this protocol data, therefore, each data frame contains information as regards the number of valid useful data of the asynchronous data stream present in the relevant data frame. Because, moreover, the position of the storage locations provided for the asynchronous data stream within the data frame is also predetermined, the valid useful data within the relevant data frame can be unambiguously identified by way of the protocol data. The receiver need merely know the selected transmission format, i.e. the receiver must know the position and the number of storage locations provided for the useful data of the asynchronous data stream and must also know where the protocol data is positioned within the data frame. Using this information, the receiver can filter the valid useful data from the relevant data frame for further processing.

The conversion of the asynchronous data into synchronous data and the reconversion of the transmitted synchronous data into asynchronous data are performed by way of a respective converter circuit. Therefore, the microprocessor of the transmitter generating the asynchronous useful data and the microprocessor of the receiver processing the asynchronous useful data are not burdened by the conversion.

An attractive version of the method is disclosed in claim 2. This version offers the advantage that a receiver can distinguish useful data of different categories on the basis of the protocol data. For example, the useful data can be distinguished as information data and control data. Control data is to be understood, for example as data which characterize the beginning of a line or the end of a line in the case of transmission of image data. In that case the information data is the image data itself.

The advantageous version of the method disclosed in claim 3 enables the transmission of asynchronous computer data between two computer systems via an intermediate synchronous bus system. The first and the second converter circuit preferably have the same construction and are provided with a respective receiver unit and a respective transmitter unit. This enables bidirectional data transmission between the two microprocessors. Because the first and the second converter circuit perform the conversion between the asynchronous and the synchronous data stream and between the synchronous and the asynchronous data stream, respectively, the computing capacity of the first and the second microprocessor will not be claimed by the conversion. This enables a saving in respect of processor capacity so that such a method can also be performed by means of microprocessors having a small computing capacity.

In conformity with the advantageous embodiment of claim 4, the synchronous bus is a continuous $I^2$-S bus. The $I^2$-S bus serves mainly for the transmission of digitized audio signals between individual integrated circuits inside an apparatus. The individual data frames of the $I^2$-S bus comprise, for example 64 bits, sub-divided into a 32-bit left data sub-frame and a 32-bit right data sub-frame.

The object according to the invention in respect of a circuit arrangement is achieved in that a converter circuit is provided for converting the asynchronous data stream into a synchronous, continuous data stream, that a selectable number of storage locations within the data frame can be assigned to the useful data of the asynchronous data stream by the converter circuit, that a variable number of useful data can be assigned to the individual data frames by means of the converter circuit and in dependence on the speed of the asynchronous data stream, and that protocol data can be assigned to the individual data frames, via the converter circuit, each time in a predetermined position within the data frame, which protocol data contains information as regards the number of useful data contained in the relevant data frame.

Some diagrammatically represented embodiments of the invention will be described in detail hereinafter with reference to the FIGS. 1 to 4 of the drawing. Therein:

FIG. 1 shows a bidirectional transmission system which includes a first microprocessor which generates an asynchronous useful data stream, a first converter circuit for converting the asynchronous useful data stream into a synchronous data stream, a synchronous data bus for the transmission of the synchronous data stream, a second converter circuit for reconverting the synchronous data stream into an asynchronous data stream, and a second microprocessor for processing the reconverted asynchronous data stream;

FIG. 2. shows a 64-bit data frame of an $I^2$-S bus;

FIG. 4a shows a data frame in conformity with line 63 of the Table of FIG. 3, containing five useful data words;

FIG. 4b shows a data frame in conformity with line 63 of the Table of FIG. 3, containing two useful data words;

FIG. 4c shows a protocol word assigned to the data frame of FIG. 4a, and

FIG. 4d shows a protocol word assigned to the data frame of FIG. 4b.

Figure 1:
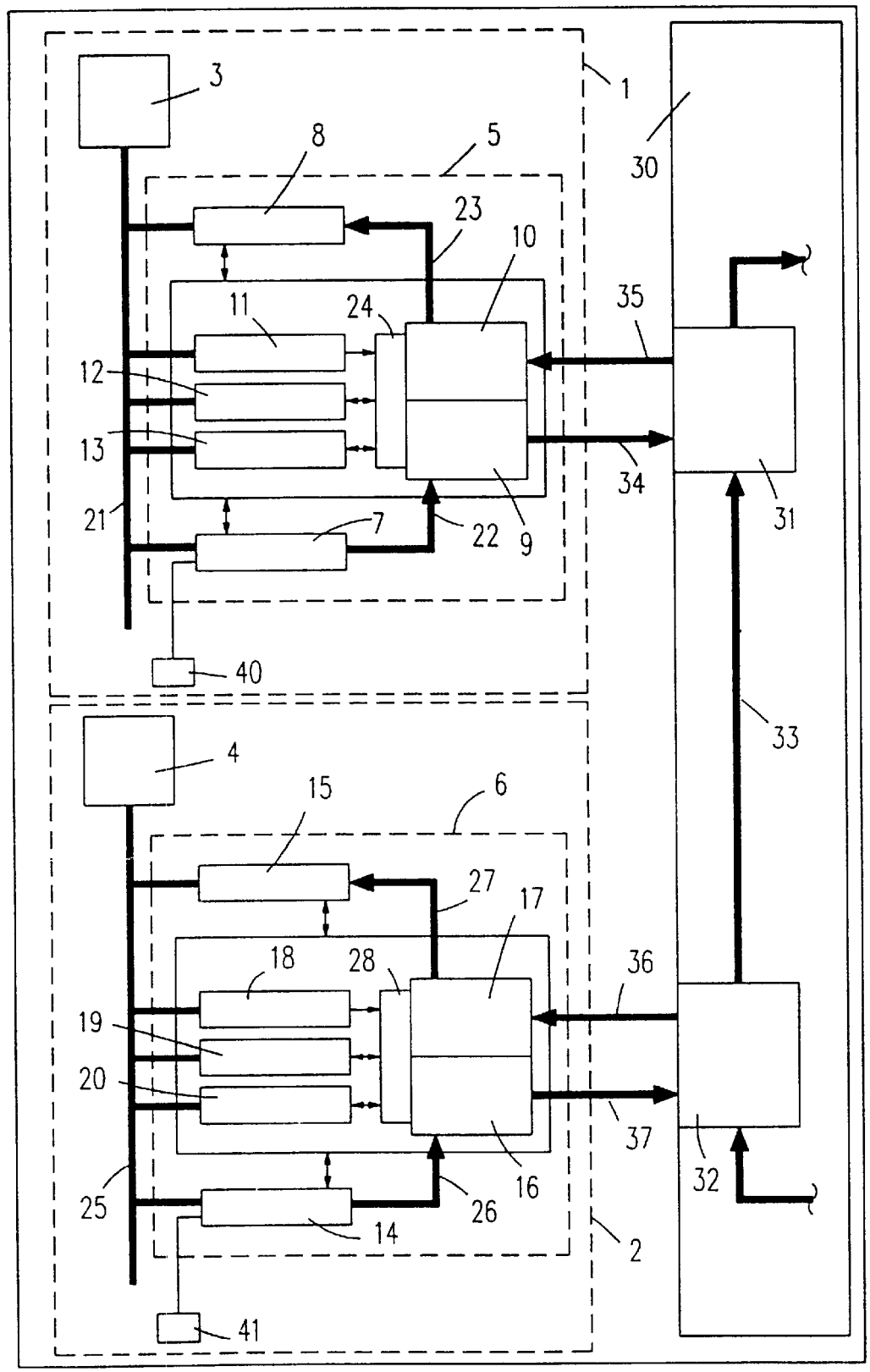

FIG. 1 shows a bidirectional transmission system which comprises a first microcomputer system 1 and a second microcomputer system 2. The first microcomputer system 1 includes a first microprocessor 3 and the second microcomputer system 2 includes a second microprocessor 4. The first microcomputer system 1 includes a first converter circuit 5 and the second microcomputer system 12 includes a second converter circuit 6. The first converter circuit 5 includes a first transmitter FIFO 7, a first receiver FIFO 8, a first transmitter element 9, a first receiver element 10, a first configuration element 11, a first control element 12 and a first bypass element 13. The second converter circuit 6 includes a second transmitter FIFO 14, a second receiver FIFO 15, a second transmitter element 16, a second receiver element 17, a second configuration element 18, a second control element 19 and a second bypass element 20. The first microprocessor 3 is connected to the first transmitter FIFO 7, the first receiver FIFO 8, the first configuration element 11, the first control element 12 and the first bypass element 13 via an 8-bit parallel data bus lead 21. The output of the first transmitter FIFO 7 is coupled to the first transmitter element 9 via a 9-bit parallel data lead 22. The first receiver element 10 is coupled to the input of the first receiver FIFO 8 via a 9-bit parallel data lead. The first configuration element 11, the first control element 12, the first bypass element 13 as well as the first transmitter element 9 and the first receiver element 10 are coupled to one another by way of control leads 24.

The second microprocessor 4 is coupled to the input of the second transmitter FIFO 14, the output of the second receiver FIFO 15 as well as to the second configuration element 18, the second control element 19 and the second bypass element 20 by way of an 8-bit data lead 25.

The output of the second transmitter FIFO 14 is coupled to the second transmitter element 16 by way of a 9-bit parallel data lead 26. The second receiver element 17 is coupled to the second receiver FIFO 15 by way of a 9-bit parallel data lead 27. The second configuration element 18, the second control element 19 and the second bypass element 20 as well as the second transmitter element 16 and the second receiver element 17 are coupled to one another by way of control leads 28.

There is provided an optical bus system 30, for example a $D^2$-B bus system, which includes a first interface 31 and a second interface 32. The first interface 31 and the second interface 32 serve to convert electric data in the $I^2$-S format into optical data of the format of the optical bus system 30. $I^2$-S is a transmission bus for digital audio signals. It consists of a serial bus with three leads, one lead being provided for two data channels in time multiplex.

The optical bus system 30 is constructed as a loop-like system whereto various electronic components of a vehicle are connected. Components that could be connected to the optical bus 30 are, for example a CD changer, a telephone, a navigation system, a power amplifier, a display as well as a radio control unit.

The first interface 31 and the second interface 32 are coupled to one another via a section 33 of the optical bus system 30. The first interface 31 is coupled, via an $I^2$-S lead 35, to the first receiver element 10 of the first microcomputer system 1 and, via an $I^2$-S lead 34, to the first transmitter element 9 of the first microcomputer system 1. The second interface 32 of the optical bus system 30 is coupled, via an $I^2$-S lead 36, to the second receiver element 17 of the second microcomputer system 2 and, via an $I^2$-S lead 37, to the second transmitter element 16 of the second microcomputer system 2.

The first microcomputer system 1 is, for example a navigation computer of a navigation system of a vehicle which is intended to transmit navigation data to a display. The display is represented by the microcomputer system 2. The navigation data of the microcomputer system 1 is asynchronous and occurs with a large bandwidth. The optical bus system 30, however, is suitable only for the transmission of serial, continuous, synchronous data. For the connection to electric apparatus there are provided the first interface 31 and the second interface 32 which convert electric data according to the $I^2$-S standard into the optical data of the bus system 30.

The method according to the invention will be described in detail hereinafter on the basis of the transmission of navigation data from the first microcomputer system 1 to the second microcomputer system 2. The first microprocessor 3 applies the asynchronous navigation data to the first transmitter FIFO 7 via the 8-bit data lead 21. The first transmitter FIFO 7 has a width of 9-bits and serves for the temporal decoupling between the first microcomputer system 1 and the bus system 30. The 8-bit data lead 21 is connected directly to the first eight inputs of the first transmitter FIFO 7. The ninth input of the transmitter FIFO 7 is connected to the output of an address decoder 40. Depending on the address used by the user in order to write an 8-bit data word into the first transmitter FIFO 7, an additional ninth bit is applied to the data word. The status of said ninth bit is dependent on the address. The user thus has the possibility of subdividing the data words into two categories, for example into control data marking the beginning and the end of a data block, and information data contained in said data block. Analogously, the 8-bit data lead of the second microcomputer system 2 is connected directly to the first eight inputs of the second transmitter FIFO 14, the ninth input of the transmitter FIFO 14 being connected to the output of an address decoder 41.

The parallel data of the first transmitter FIFO 7 is applied to the first transmitter element 9 which converts the parallel data into a serial data stream by means of a parallel-series shift register (not shown). This conversion will be described in detail hereinafter with reference to the FIGS. 2 to 4.

Figures 2, 3:
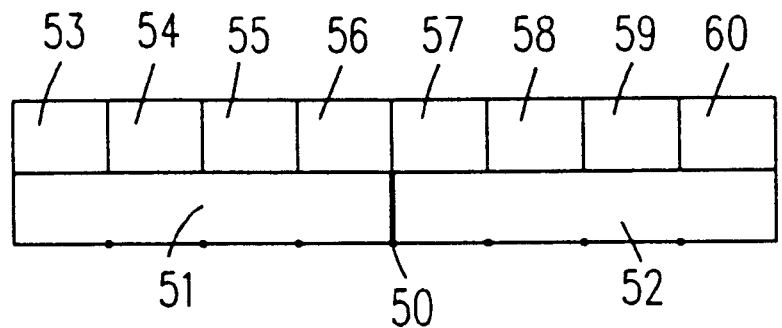
FIG. 3 shows a table illustrating four possibilities for using the storage capacity of a data frame of an $I^2$-S bus in conformity with FIG. 2 for the data transmission between the first microprocessor and the second microprocessor of FIG. 1.

FIG. 2 shows a 64-bit data frame 5 formed in conformity with the $I^2$-S standard. The $I^2$-S data frame 50 is subdivided into a left channel 51 and a right channel 52. The left channel 51 is subdivided into a first data word 53, a second data word 54, a third data word 55 and a fourth data word 56. The right channel 52 is subdivided into a fifth data word 57, a sixth data word 58, a seventh data word 59 and an eighth data word 60. Each of the data words 53 to 60 comprises one byte.

FIG. 3 shows a table illustrating four possibilities for using the data frame 50 for the data transmission between the first microcomputer system 1 and the second microcomputer system 2 in conformity with FIG. 1. Each time the eight data words 53 to 60 of a data frame 50 are shown, the data words 53 to 60 being used each time in a different way for the data transmission between the microcomputer system 1 and the second microcomputer system 2. In the example according to line 61 of the table, only the first data word 53 and the fifth data word 57 of the eight data words 53 to 60 are available for the transmission between the first microcomputer system 1 and the second microcomputer system 2. The first data word 53 is used for useful data N of the first microcomputer system 1 or the second microcomputer system 2, whereas the fifth data word 57 is a protocol word P which contains protocol data.

In the example according to line 62 of the table of FIG. 3 the first data word 53, the second data word 54, the fifth data word 57 and the sixth data word 58 are available for the transmission between the first microcomputer system 1 and the second microcomputer system 2. The first data word 53, the second data word 54 and the fifth data word 57 are available for the transmission of useful data N, whereas the sixth data word 58 is a protocol word P containing protocol data.

In the example according to line 63 of the table of FIG. 3 the first data word 53, the second data word 54, the third data word 55, the fifth data word 57, the sixth data word 58 as well as the seventh data word 59 are available for the transmission of data between the first microcomputer system 1 and the second microcomputer system 2. The first data word 53, the second data word 54, the third data word 55, the fifth data word 57 and the sixth data word 58 are intended for the transmission of useful data N whereas the seventh data word 59 is a protocol word P containing protocol data.

In the example according to line 64 the overall capacity of the $I^2$-S data frame 50, and hence all data words 53 to 60, is available for the transmission of data between the first microcomputer system 11 and the second microcomputer system 2. The data words 53 to 59 are available for the transmission of useful data N whereas the eighth data word 60 is a protocol word P containing protocol data.

The protocol word P in forms the receiver each time how many valid data words with useful data are present in a data frame. Moreover, the protocol word contains information as to whether the useful data concerns information data or control data. The protocol word is present in each data frame 50 and concerns only information as regards the data words especially present in the relevant data frame.

In the example according to line 61 of FIG. 3 the data words 54, 55, 56, 58, 59 and 60 of the data frame can be used for the transmission between other components of the bus system 30. In the example according to line 62 the data words 55, 56, 59 and 60 can be used for the data transmission between other components of the optical bus system 30. In the example according to line 63 merely the fourth data word 56 and the eighth data word 60 can be used for the data transmission between other bus components of the optical bus system 30.

The number of data words available within the individual data frame 50 for the transmission between the first microcomputer system 1 and the second microcomputer system 2 can be varied by means of the first configuration element 11 of the first converter circuit 5, or the second configuration element 18 of the second converter circuit 6, as a function of the application. Preferably, this adjustment is fixed for the relevant application and no longer varied during operation of the circuit. However, it is also possible to vary the number of data words available for the data transmission between the first microcomputer system 1 and the second microcomputer system 2 during operation.

The individual write and read operation of the first converter circuit 5 and the second converter circuit 6 can be con trolled by means of the first control element 12 and the second control element 19, respectively. The first control element 12 and the second control element 19 include registers which supply the first microcomputer system 1 and the second microcomputer system 2 with information as regards the state or status of the data transmission between the first microcomputer system 1 and the second microcomputer system 2. Bypass data, having a higher priority,i can be transmitted with priority by way of the first bypass element 13 and the second bypass element 20. The first bypass element 13 and the second bypass element 20 include bypass registers (not shown) which are intended to transmit and receive priority data. This priority data is applied directly, while bypassing the first transmitter FIFO 7, the second transmitter FIFO 14, the first receiver FIFO 8 or the second receiver FIFO 15, to the first transmitter element 9, the second transmitter element 16, the first receiver element 10 and the second receiver element 17, respectively.

The protocol word is formed by the first transmitter element 9 and the second transmitter element 16. To this end, the first transmitter element 9 counts, using a counter circuit (not shown), the number of valid data bytes containing useful data, said number being inserted in the relevant data frame 50. Three bits of the total of 8 bits of the protocol word P are available for this purpose. A further bit of the protocol word is used as a stop bit for automatic interruption of the transmission. The stop bit can be used, for example in such a manner that the receiver informs the transmitter that it cannot sufficiently quickly process the instantaneously transmitted data. If the stop bit is set, the transmitter can then insert a transmission pause. The remaining four bits of the protocol word P are used to distinguish the data words, containing useful data N, as information data and control data. Control data is to be understood to mean data which characterizes the beginning and the end of the line in the case of transmission of image data. Information data is to be understood to mean the image data itself.

The data stream formed by means of the first converter circuit 5 is applied, via the I²-S lead 35, to the first interface 31 which converts the serial electric data into serial optical data. Subsequently, the serial data is applied, via the section 33 of the bus system 30, to the second interface 32 which converts this data into electric serial signals again. The serial electric signals are then applied, via the I²-S lead 36, to the second receiver element 17 of the second converter circuit 6.

The reconversion of the serial I²-S data into asynchronous, parallel data is performed by means of the second converter circuit 6. After a complete data frame 50 of the serial I²-S data stream has been received, the protocol word P is evaluated so as to determine how many useful data N and what type of useful data N is contained in the relevant data frame. Because the protocol word is always situated in the same position in conformity with the selected data capacity available within the individual data frame 50 for the transmission between the first microcomputer system 1 and the second microcomputer system 2, the protocol word P can be very simply separated by means of the second receiver element 17, for example by means of a switchable register, from the remaining data bytes of the individual I²-S data frame 50. Using the information of the relevant protocol word P, the second receiver element 17 converts the data byte of the individual data frame 50, via a series-parallel shift register (not shown), into parallel data again, which data is applied to the second receiver FIFO 15. The second microprocessor 4 can then read and process this data via the 8-bit data lead 25.

The formation of the individual data frame 50 and the protocol word P by means of the first transmitter element 9 and the second transmitter element 16 will be described in detail hereinafter with reference to the FIGS. 4a to 4d.

In the example on which the FIGS. 4a to 4d are based there are seven useful data words N1, N2, N3, N4, N5, N6 and N7, which have been transmitted to the first transmitter FIFO 7 by the first microprocessor 3 of FIG. 1, and are converted into a serial, synchronous, continuous data stream by means of the first transmitter element 9.

The first converter circuit 5 and the second converter circuit 6 are adjusted in conformity with the example of line 63 of the table of FIG. 3. The first data word 53, the second data word 54, the third data word 55, the fifth data word 57, the sixth data word 58 and the seventh data word 59 are thus available for the transmission of data between the first microcomputer system 1 and the second microcomputer system 2.

FIG. 4a shows the configuration of the first data frame 50, formed by the first transmitter element 9, and FIG. 4b shows the subsequent data frame 50.

In conformity with FIG. 4a, the first useful data word N1 is assigned to the first data word 53 of the data frame 50, the second useful data word N2 to the second data word 54, the third useful data word N3 to the third data word 55, the fourth useful data word N4 to the fifth data word 57, the fifth useful data word N5 to the sixth data word 58, and the protocol word P is assigned to the seventh data word 59 of the data frame 50. The temporally subsequent data frame 50 shown in FIG. 4b comprises the two remaining useful data words N6 and N7. The sixth useful data word N6 is assigned to the first data word 53 and the seventh useful data word N7 is assigned to the second data word 54 of the data frame 50 of FIG. 4b. Because no further useful data is available in the transmitter FIFO 9 of FIG. 1, the third data word 55, the fifth data word 57 and the sixth data word 58 are filled with zeros by means of the first transmitter element 9. The seventh data word 59 of the data frame 50 of FIG. 4b is again a protocol word P.

FIG. 4c shows the configuration of the protocol word of the data frame 50 of FIG. 4a. The protocol word P of FIG. 4c includes a first counter bit 70, a second counter bit 71 and a third counter bit 72. The protocol word 2 also includes a stop bit 73 as well as a first qualifier bit 74, a second qualifier bit 75, a third qualifier bit 76 and a fourth qualifier bit 77. Because the data frame 50 of FIG. 4a includes five useful data words, the counter bits 70 to 72 contain the counting information "5". Thus, the first counter bit 70 is 1, the second counter bit 71 is 1 and the third counter bit 72 is 0. The stop bit 73 is also 0, because no interruption of the data transmission is requested in this example. The first qualifier bit 74 is assigned to the first data frame 53, the second qualifier bit 75 to the second data word 54, the third qualifier bit 76 to the third data word 55 and the fourth qualifier bit 77 is assigned to the fifth data word 57. The qualifier bits 74 to 77 can be used to determine whether the relevant associated data word concerns an information data word or a control data word. The first qualifier bit 74 is 1. In the present example this serves to indicate that the first useful data word N1 concerns a control data word which characterizes, for example the beginning of a line in the case of an image data transmission. The qualifier bits 75 to 77 are 0. Therefore, the associated useful data words N2, N3 and N4 are information data words. The fifth useful data word N5 is also an information data word. Because the protocol word P has a width of 8 bits only and hence no qualifier bit is available for the sixth data word 58, the first transmitter element 9 is adjusted so that the sixth data word 58 is filled with a useful data word only if this useful data word concerns an information data word. If a control useful data word is present, it is assigned to the next data frame 50 in which it is characterized by an appropriate qualifier bit.

The protocol word P of FIG. 4d is assigned to the data frame 50 of FIG. 4b. Because the data frame 50 of FIG. 4b comprises only two useful data words N6 and N7, the counter bits 70 to 72 provide the counting information "2". Therefore, the first counter bit 70 is "0", the second counter bit 71 is "1" and the third counter bit 72 is "0". The stop bit 73 is also "0", because there is no request for interruption of the data transmission. Because the useful data words N6 and N7 concern information data words, the qualifier bits 74 and 75 are "0". Because the data words 55 and 57 do not contain useful data words, the associated qualifier bits 76 and 77 are also "0".

What is claimed is:

1. A method for the transmission of an asynchronous data stream, containing useful data intended to be transmitted, via a synchronous data bus which is arranged to transmit data frames in time multiplex, characterized in that the asynchronous data stream is converted into a synchronous, continuous data stream by means of a converter circuit, that within the data frames a number of predetermined storage locations is provided for the useful data of the asynchronous data stream, that a variable number of useful data can be assigned to the individual data frames by means of the converter circuit and in dependence on the speed of the asynchronous data stream, and that protocol data is assigned to the individual data frames, via the converter circuit, each time in a predetermined position within the data frames, which protocol data contains information as regards the number of useful data contained in the relevant data frame, and that bypass data of higher priority of the asynchronous data stream can be inserted into the synchronous data stream with temporal priority by way of a bypass register of the converter circuit.

2. A method as claimed in claim 1, characterized in that the protocol data contains information as regards the type of useful data.

3. A method as claimed in claim 1, characterized in that the asynchronous data stream is generated by a first microprocessor, is converted into a synchronous, continuous data stream by means of a first converter circuit, is transmitted via the synchronous data bus, is converted into an asynchronous data stream again by means of a second converter circuit, and is applied to a second microprocessor.

4. A method as claimed in claim 1, characterized in that the synchronous bus is a continuous $I^2$-S bus.

5. The method as claimed in claim 1 wherein the number of the storage locations is selectable.

6. A circuit arrangement for the transmission of an asynchronous data stream, containing useful data intended to be transmitted, via a synchronous data bus which is arranged to transmit data frames in time multiplex, characterized in that a converter circuit is provided for converting the asynchronous data stream into a synchronous, continuous data stream, that a number of predetermined storage locations within the data frame can be assigned to the useful data of the asynchronous data stream by the converter circuit, that a variable number of useful data can be assigned to the individual data frames by means of the converter circuit and in dependence on the speed of the asynchronous data stream, and that protocol data can be assigned to the individual data frames, via the converter circuit, each time in a predetermined position within the data frame, which protocol data contains information as regards the number of useful data contained in the relevant data frame.

7. A vehicle comprising a circuit arrangement as claimed in claim 6.

8. The circuit as claimed in claim 6 wherein the number of the storage locations is selectable.

9. An electronic system, notably a navigation system, comprising:
   a first microprocessor which generates an asynchronous useful data stream,
   a circuit arrangement for the transmission of an asynchronous data stream, containing useful data intended to be transmitted, via a synchronous data bus which is arranged to transmit data frames in time multiplex, in which
   a first converter circuit is provided for converting the asynchronous data stream into a synchronous, continuous data stream,
   a number of predetermined storage locations within the data frame can be assigned to the useful data of the asynchronous data stream by the first converter circuit,
   a variable number of useful data can be assigned to the individual data frames by means of the first converter circuit and in dependence on the speed of the asynchronous data stream, and
   protocol data can be assigned to the individual data frames, via the first converter circuit, each time in a predetermined position within the data frame, which protocol data contains information as regards the number of useful data contained in the relevant data frame,
   a synchronous, continuous data bus, notably an I2-S bus, for the transmission of the synchronous data stream,
   a second converter circuit for reconverting the synchronous data stream into an asynchronous data stream again, and
   a second microprocessor for processing the reconverted asynchronous data stream.

10. The circuit arrangement as claimed in claim 9, characterized in that with the first microprocessor there is associated a navigation computer of a navigation system which generates asynchronous image data, that the data bus is an optical bus, and that a display device of a navigation system is associated with the second microprocessor.

11. A method for the transmission of asynchronous image data between a navigation computer of a navigation system and a display system of a navigation system, via a synchronous data bus which is arranged to transmit data frames in time multiplex, characterized in that the asynchronous image data is converted into a synchronous, continuous data stream by means of a converter circuit, that within the data frames a number of predetermined storage locations is provided for the useful data of the asynchronous image data, that a variable number of useful data can be assigned to the individual data frames by means of the converter circuit and in dependence on the speed of the asynchronous image data, and that protocol data is assigned to the individual data frames, via the converter circuit, each time in a predetermined position within the data frames, which protocol data contains information as regards the number of useful data contained in the relevant data frame.

* * * * *